April 14, 1931.  L. V. ARONSON  1,800,334
LIGHTER CONSTRUCTION
Filed July 12, 1929
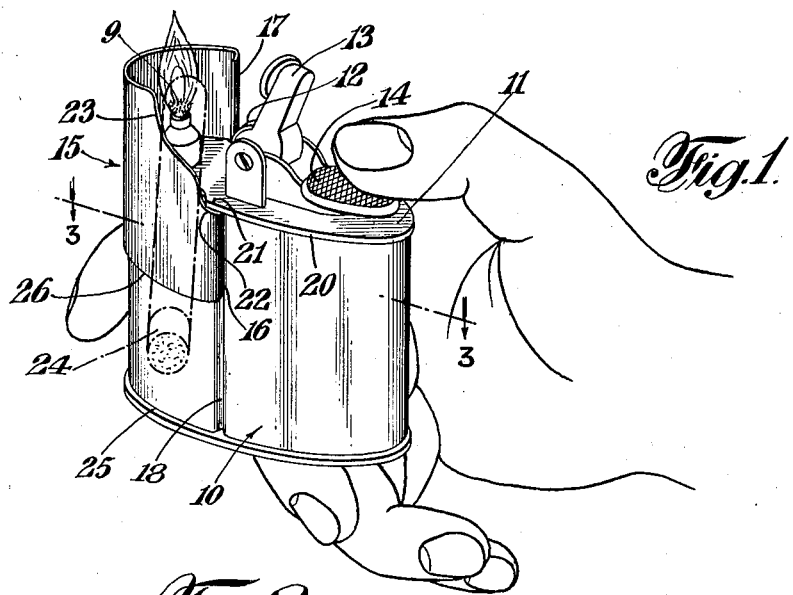
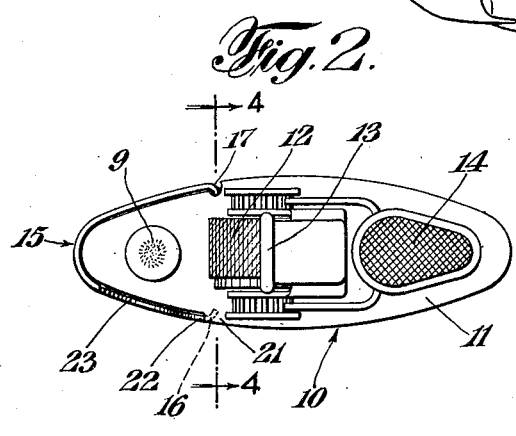
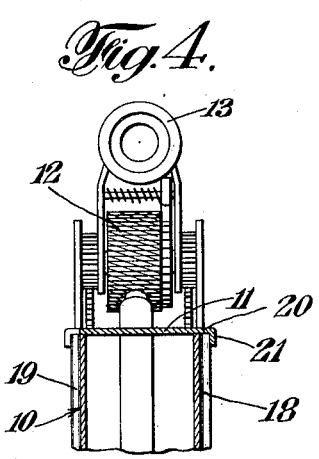
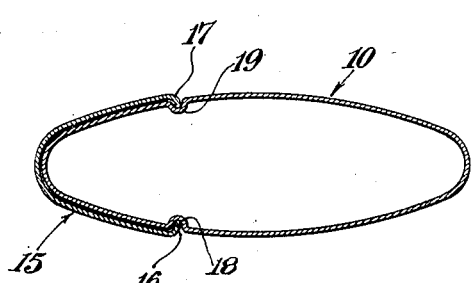
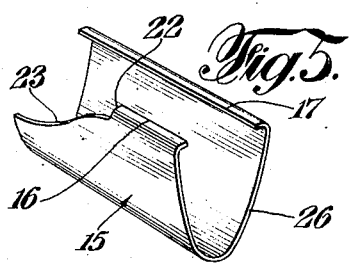
INVENTOR
Louis V. Aronson
BY
Ward, Crosby & Neal
ATTORNEYS Patented Apr. 14, 1931

1,800,334

UNITED STATES PATENT OFFICE

LOUIS V. ARONSON, OF NEWARK, NEW JERSEY, ASSIGNOR TO ART METAL WORKS, INC., A CORPORATION OF NEW JERSEY

LIGHTER CONSTRUCTION

Application filed July 12, 1929. Serial No. 377,746.

This invention relates to cigar lighters or similar devices and more particularly to means for shielding the flame of the lighter against drafts of air.

The objects of the invention include the provision of a highly efficient lighter windshield arrangement of simple construction and of pleasing appearance and which according to one phase of the invention may be slidably mounted to be moved into and out of operative position.

Further and more specific objects, features and advantages will more clearly appear from the detailed description given below taken in connection with the accompanying drawings which form a part of this specification and which illustrate an embodiment of the present invention.

The invention consists in the novel features, arrangements and combinations of parts embodied by way of example in the construction hereinafter described, as illustrating a preferred form of the invention.

In the drawings, Fig. 1 is a perspective view indicating the manner of operation of a lighter embodying the windshield construction of the present invention;

Fig. 2 is a top or plan view of the same device;

Figs. 3 and 4 respectively are sectional views taken substantially along the lines 3—3 and 4—4 of Figs. 1 and 2 respectively; and Fig. 5 is a perspective view of the windshield comprising one example of the invention, as removed from the lighter.

In the drawings the invention is shown as applied to one very well known form of lighter construction, but it will be appreciated that the invention is adaptable for use in connection with many of the other known forms of cigar lighters or the like devices.

A lighter wick is indicated at 9 extending through a suitable wick tube from the lighter fuel receptacle 10. Suitable pyrophoric lighting mechanism is indicated at the top of the fuel receptacle 11 for igniting the wick. This mechanism in the example shown comprises a sparking wheel 12 associated with a snuffer cap 13, which is operated with the sparking wheel by a finger piece 14, through suitable well known rack and pinion or equivalent means as shown.

A slidable windshield member is indicated at 15 and comprises a pair of side plates having inwardly turned flanged edges as at 16 and 17 for slidably engaging suitable vertical grooves as at 18 and 19 formed in the side walls of the fuel receptacle 10. The side walls if desired may comprise a substantially oval tubular member forming the body of the fuel receptacle, the grooves 18 and 19 being struck inwardly whereby inexpensive means are provided integral with the side walls for slidably engaging the windshield flanges.

If desired the top of the fuel receptacle may be provided with a somewhat overhanging flange or beaded portion 20, which flange may be suitably cut away where it is embraced by the windshield, except at a point indicated at 21. The portion 21 may thereby serve as a stop means engaging the upper end 22 of the flanged edge 16. It will be noted that an area of the windshield at 23 may be conveniently cut away so as to render the flame readily accessible and permitting the insertion of a cigarette, cigar or the like as at 24 to a position directly within the flame. Furthermore, this cut-away portion is advantageously located at the side of the lighter so that the stop means 22 at the lower edge of the cut-away portion is provided without additional expense and without the necessity of adding any cumbersome stop means to limit the upward movement of the windshield.

The windshield member 15 may be conveniently made of flexible sheet metal or other resilient means whereby its side plates closely embrace and substantially fit the edge of the fuel receptacle and engage the same with sufficient friction to retain the windshield either in its operative upper position as shown in Fig. 1, or in an inactive position.

It will be understood that when it is not desired to use the windshield, the same may be slid downwardly until the lower flanged edges 25 of the fuel receptacle are engaged by the lower edge 26 of the windshield. The flanged edge of the fuel receptacle thereby serves as a stop means limiting the downward movement of the windshield.

With the above described construction, a windshield of unusual efficiency is provided since, although the flame is accessible from one side for convenient use, the remaining sides are well shielded not only by the windshield, but by the adjacent snuffer cap 13 when in its substantially vertical raised position during use of the lighter. The cut away area 23 being toward the user and being to a large extent filled by the object, such as a cigarette which is to be lighted, does not require further shielding means. Since the cut-away portion of the windshield permits access to the flame from the side, the user may hold the cigarette or the like in normal position while it is being lighted, but without any necessity for bringing the flame beneath the lighter's face. Therefore the flame is properly shielded without any inconvenience or danger to the user.

It will be observed that sufficient material is removed at the lower edge of the cut-away portion 23 to provide only for the desired stop means 22 and to permit access of sufficient air to provide for proper ignition at the wick. On the other hand, the upper portion of the cut-away area is larger to permit insertion of a cigarette or cigar.

If the lighter is to be used indoors or is used in the presence of drafts of air only infrequently, the user may find it more convenient and more compact for carrying in his pocket if he slides the windshield down to its inactive position. In its inactive position the windshield closely embraces the fuel receptacle and since it conforms closely to the shape of the receptacle, substantially no additional space is required. If desired, the windshield element may be sold or distributed separately from the lighters so that the buyer may purchase the lighter either with or without the windshield as desired. When the windshield is sold or distributed separately, the user may quickly apply it to the lighter by pressing it against the edge of the fuel receptacle so that it snaps into position. In repairing or cleaning the lighter mechanism, the windshield may be either moved down to its inactive position, or may be removed entirely by a slight separation of its side plates.

While I have described my improvements in detail and with respect to various forms thereof, I do not desire to be limited to such details or forms, since many changes and modifications may be made and the invention embodied in other forms without departing from the spirit and scope of the invention in its broader aspects. Hence I desire to cover all modifications and forms coming within the language or scope of any one or more of the appended claims.

What I claim as new and desire to secure by Letters Patent is:

1. A lighter construction comprising a fuel receptacle, a wick thereon, a windshield slidable along one edge of said receptacle into and out of active shielding position, and stop means at opposite wall surfaces of said receptacle for respectively limiting the movement of said windshield in the direction toward its active and inactive positions, a portion of the shield member being cut away for access of the cigarette or the like, the lower edge of such cut-away portion providing stop means cooperating with one of said stop means on said receptacle.

2. The combination with a pyrophoric lighter fuel casing, of a substantially U-shaped windshield vertically slidable on the exterior surface of said casing, and tongue-and-groove mechanism serving solely to retain said windshield to said casing during sliding movement of said windshield.

3. The combination with a pyrophoric lighter fuel casing, of a substantially U-shaped windshield vertically slidable on the exterior surface of said casing, and tongue-and-groove mechanism serving solely to retain said windshield to said casing during sliding movement of said windshield, adjacent surfaces of said casing and windshield being in close-fitting, frictional relation whereby said windshield remains in an adjusted position.

4. The combination with a pyrophoric lighter fuel casing, of a substantially U-shaped windshield vertically slidable on the exterior surface of said casing and held thereto in tongue-and-groove relation, said windshield being detachable from said casing when moved laterally from the longitudinal axis thereof, the interengaged tongues and grooves causing said windshield to spread when thus moved laterally.

In testimony whereof I have signed my name to this specification.

LOUIS V. ARONSON.